UNITED STATES PATENT OFFICE.

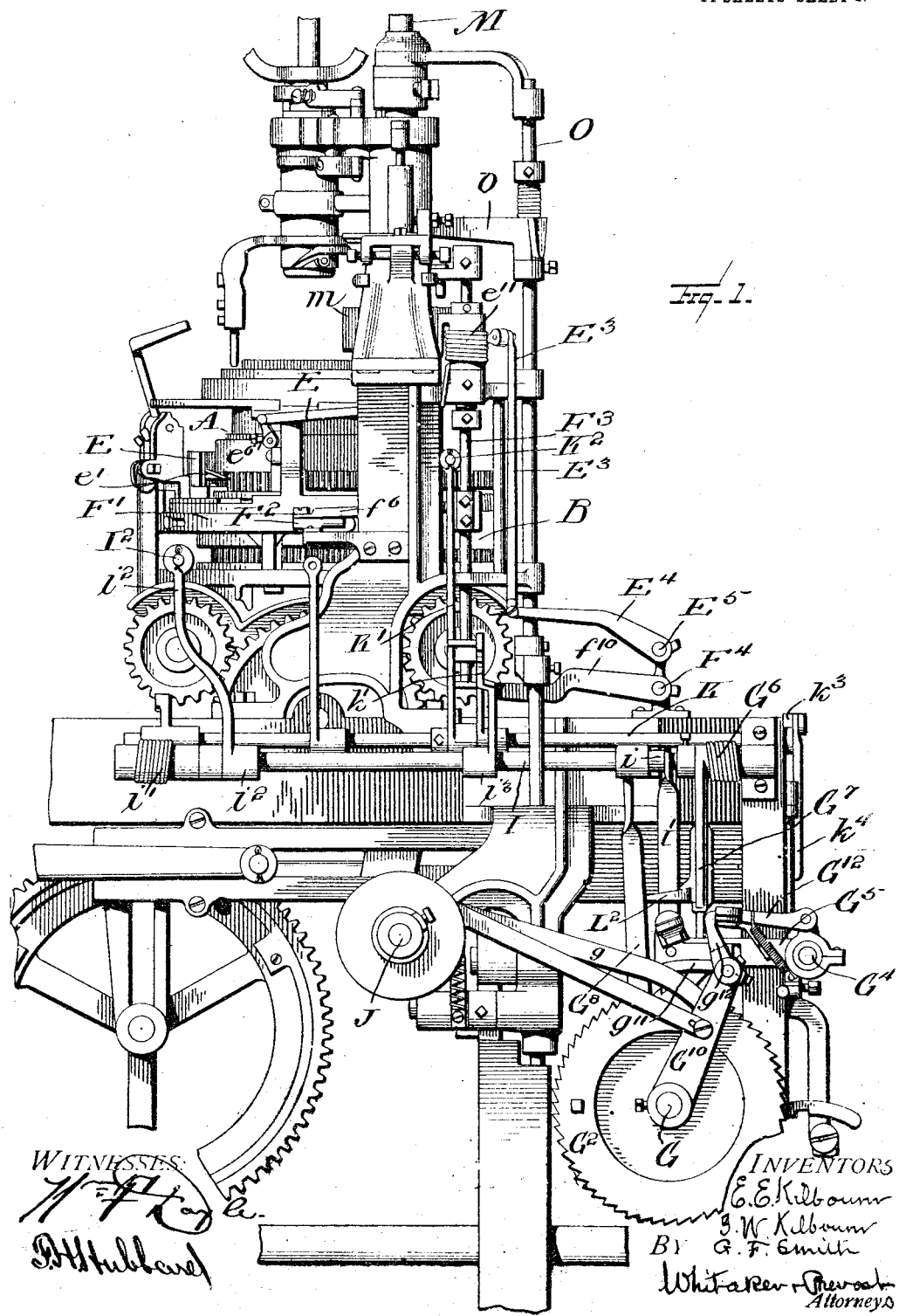

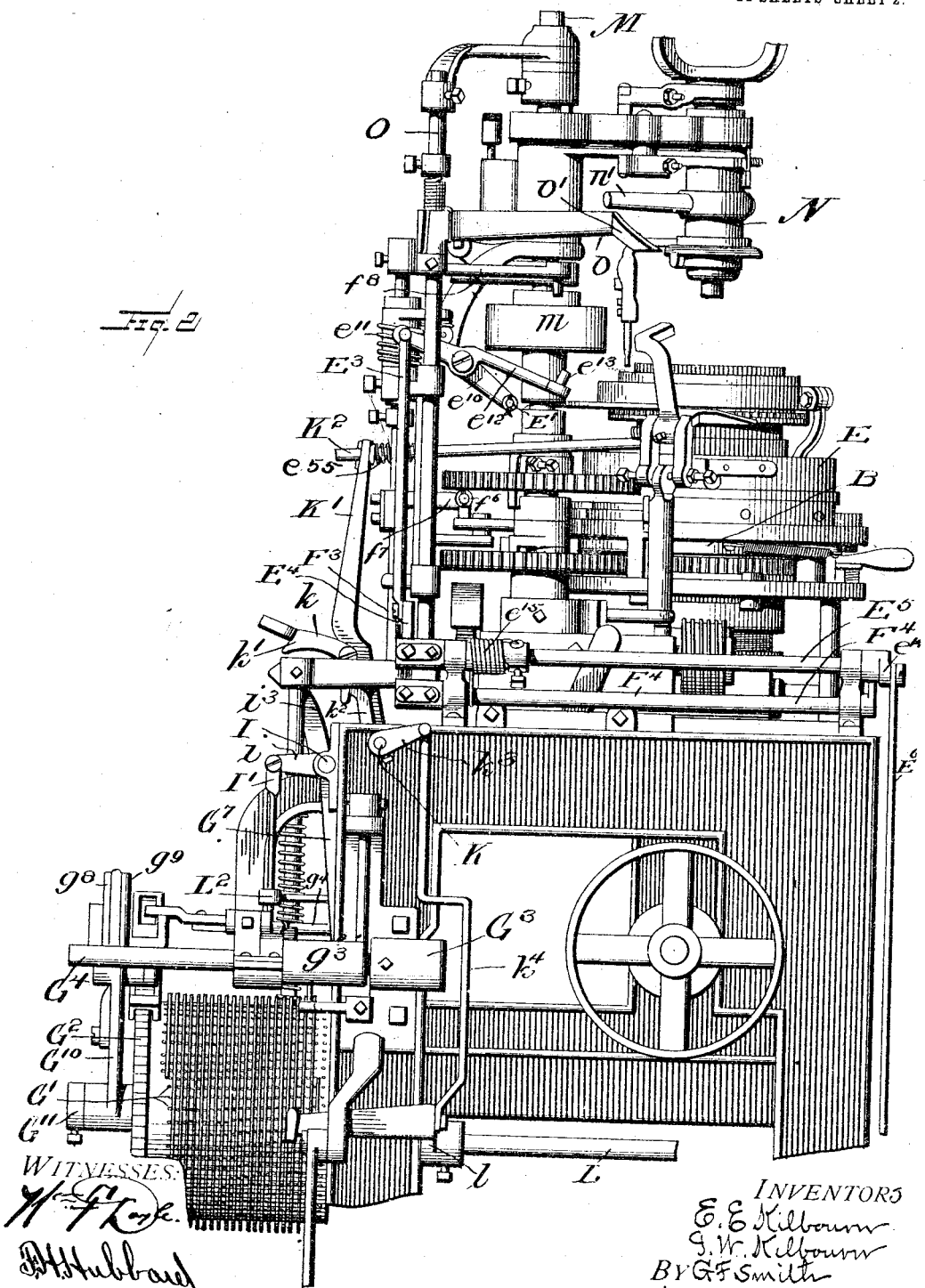

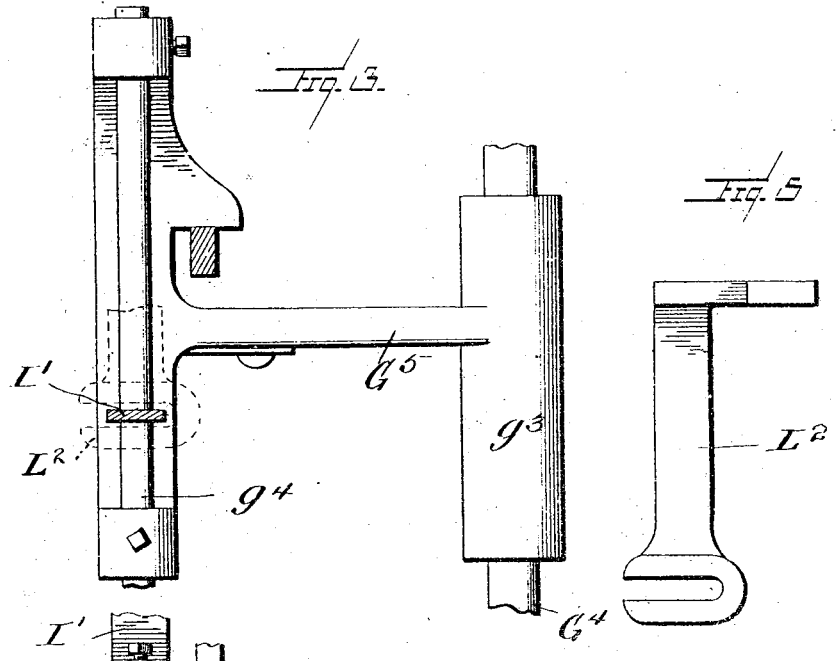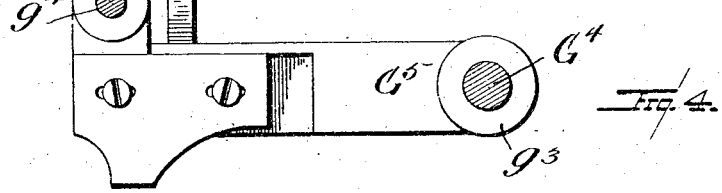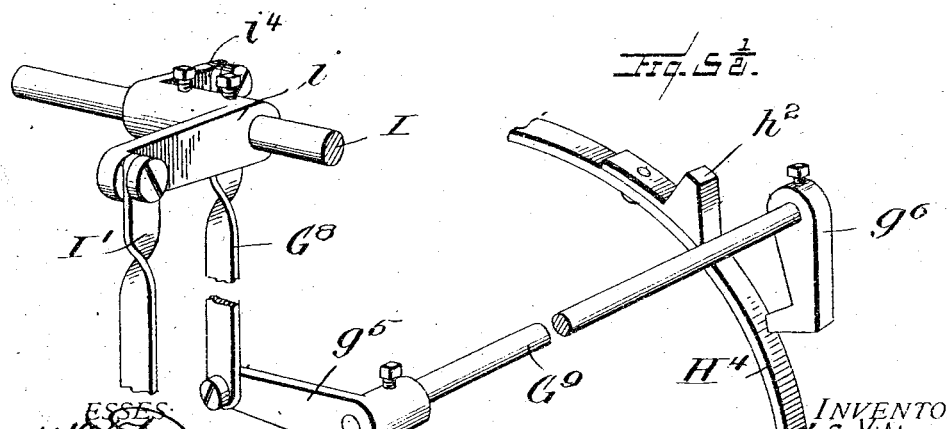

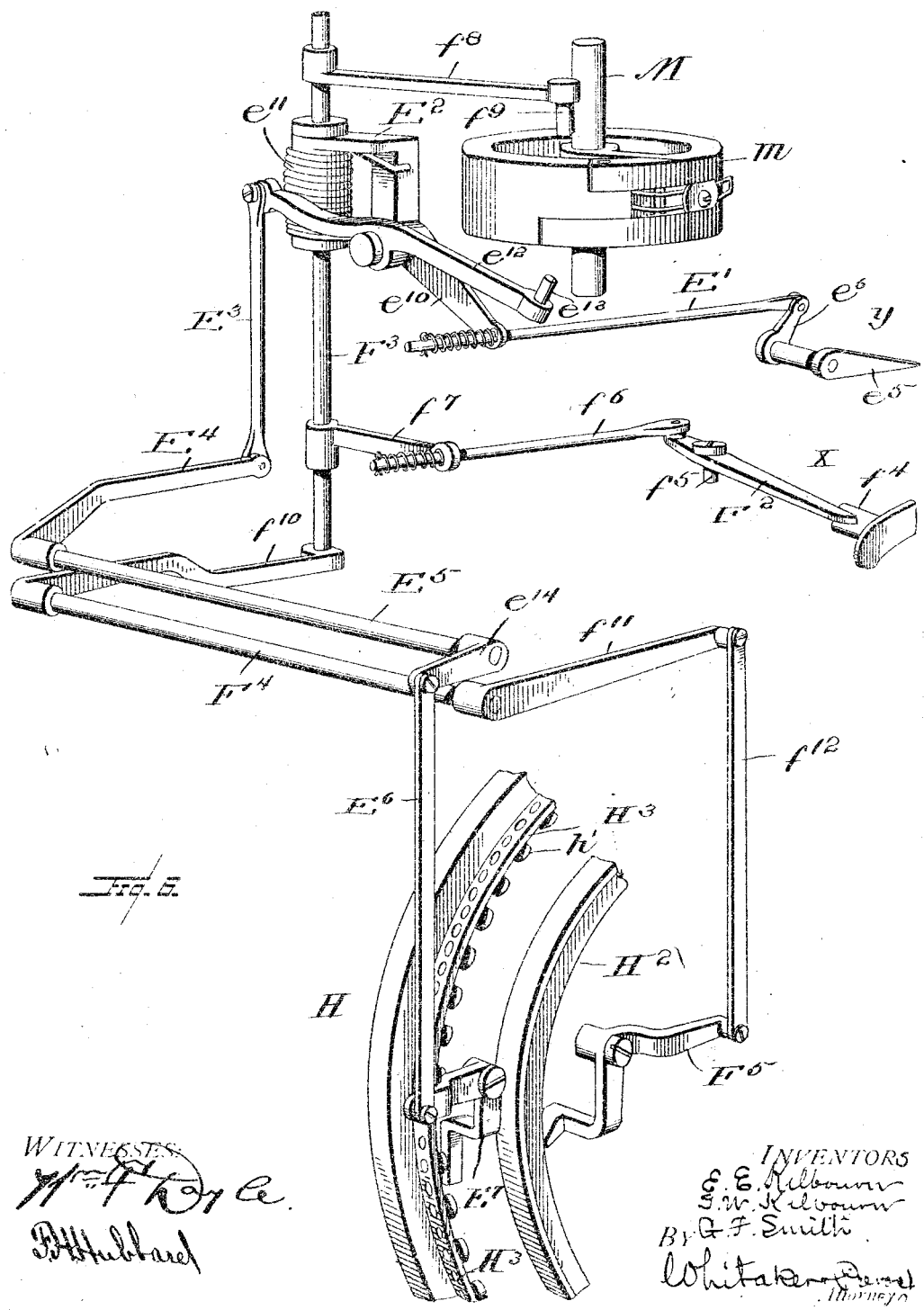

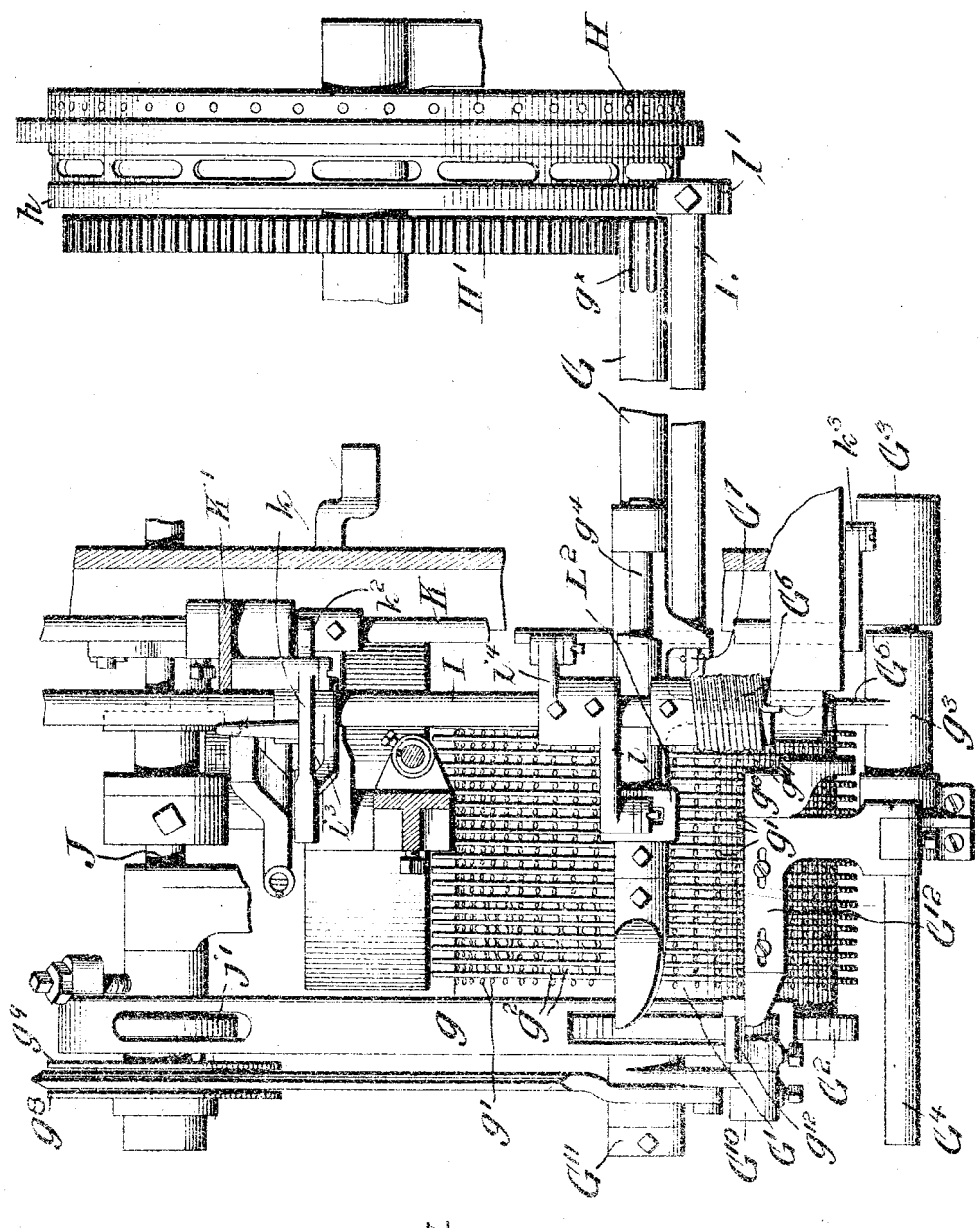

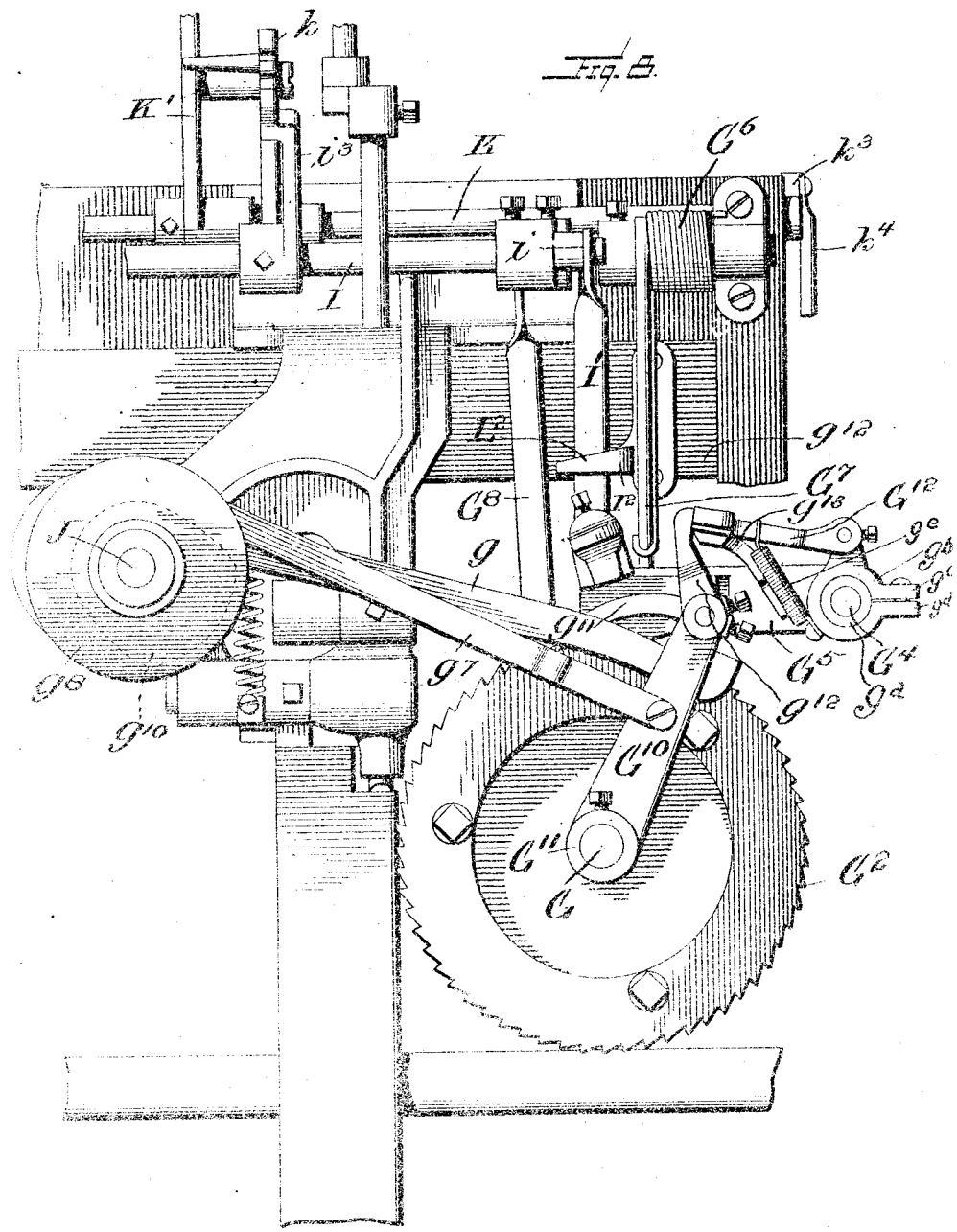

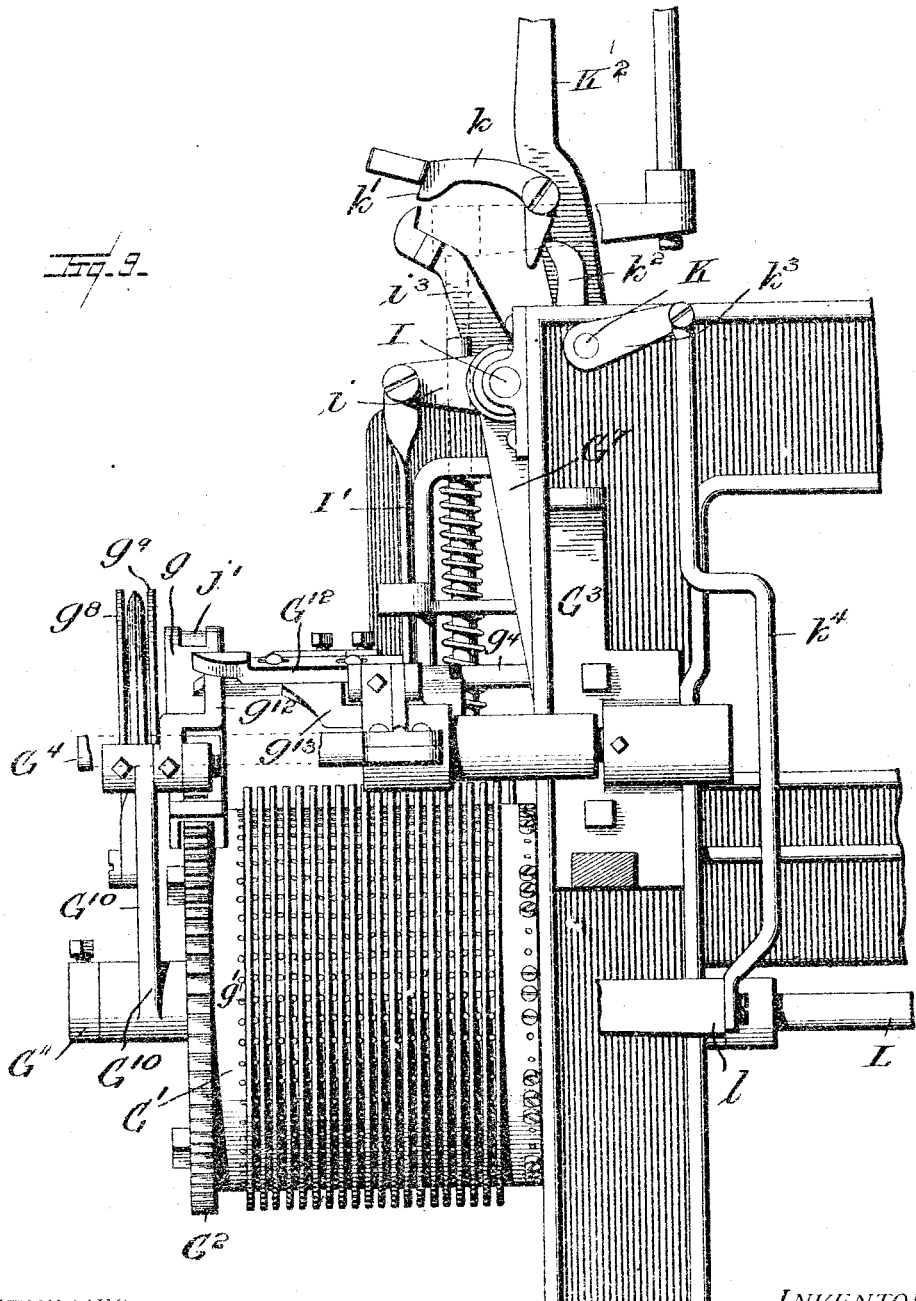

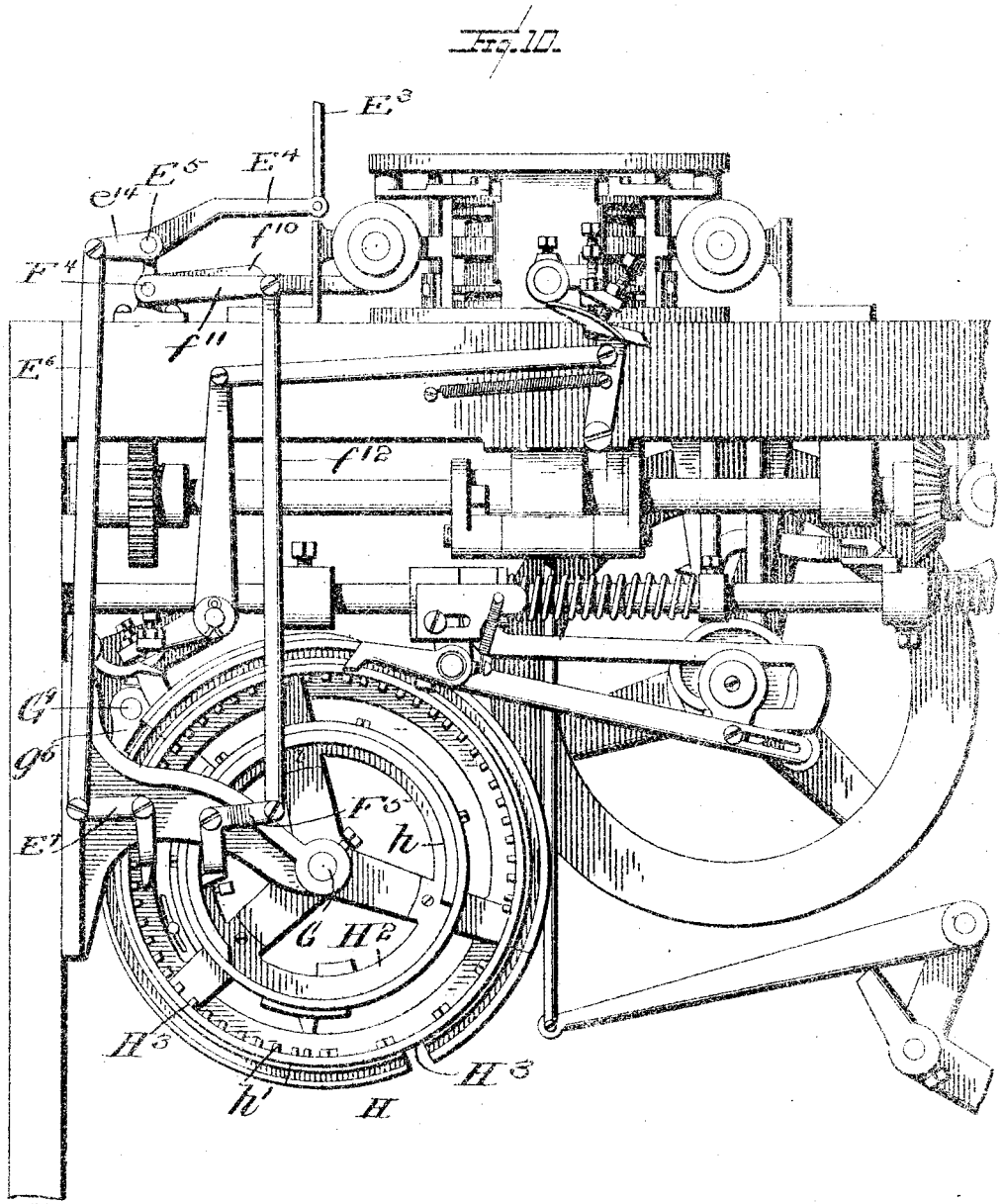

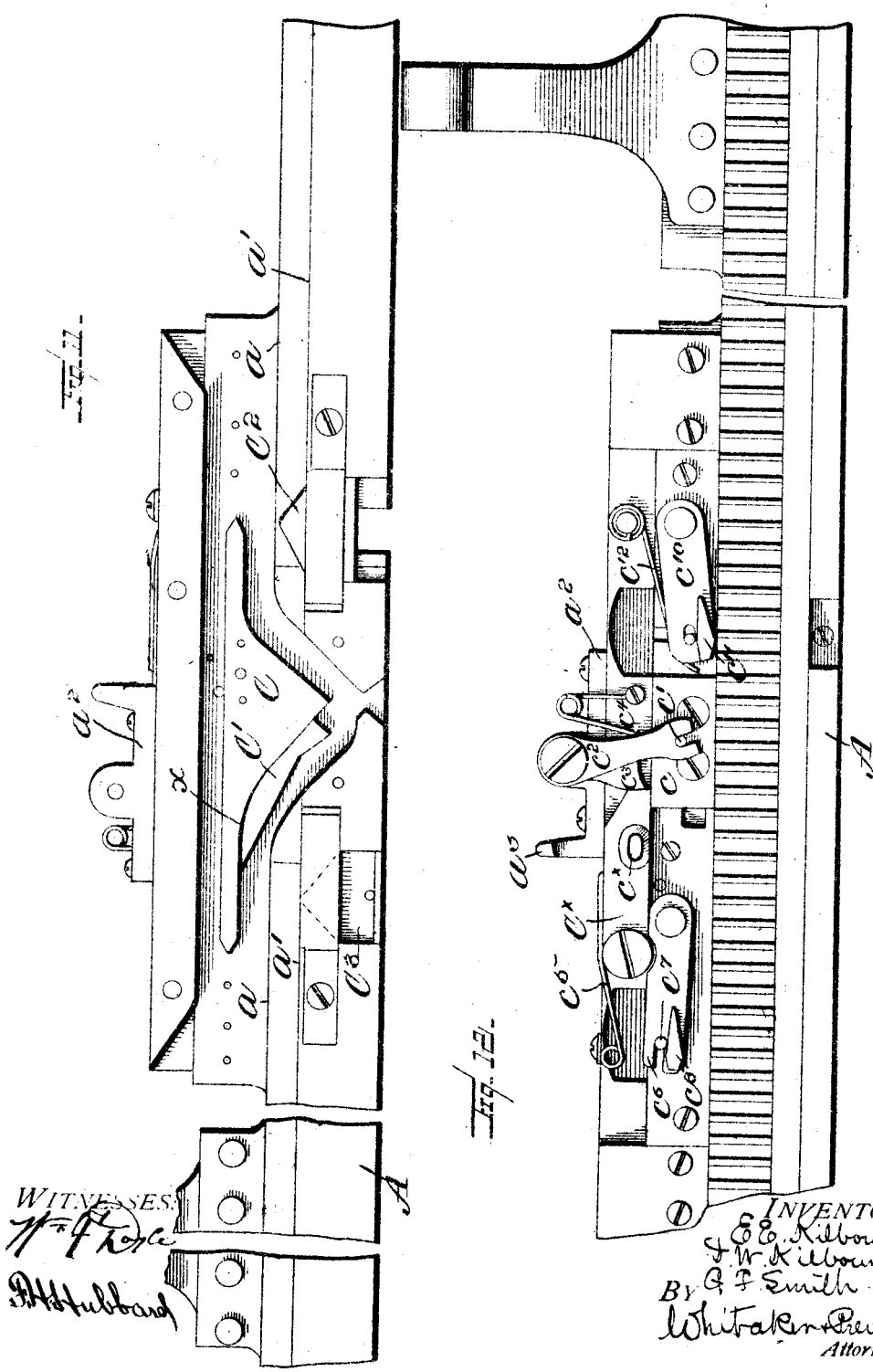

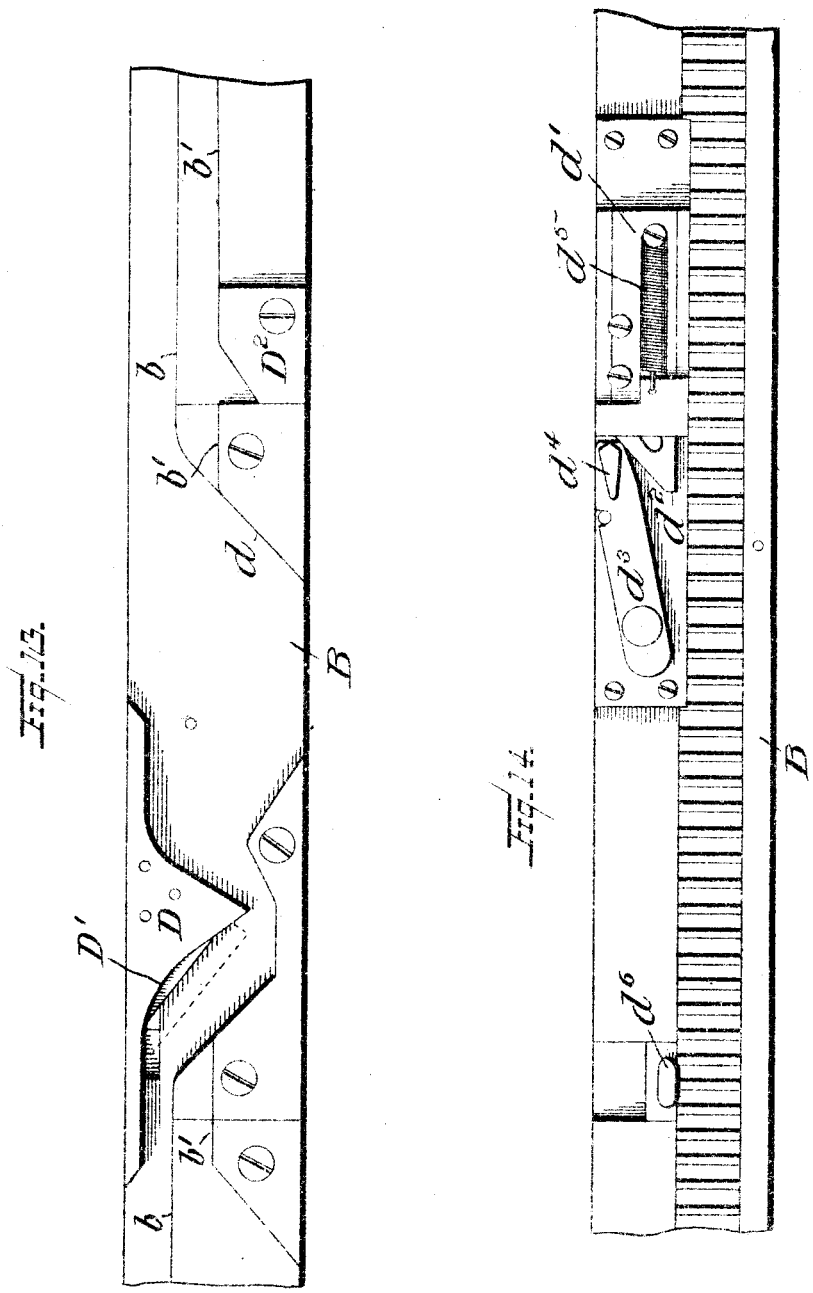

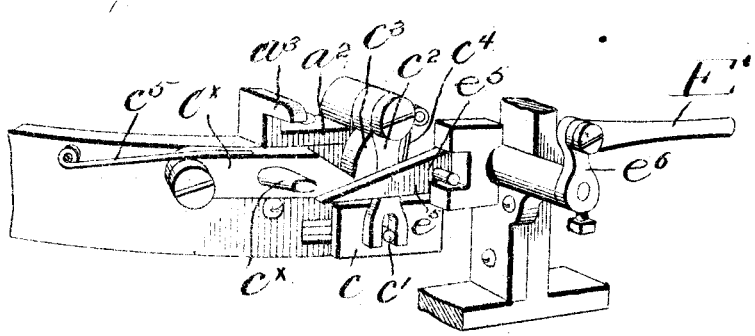
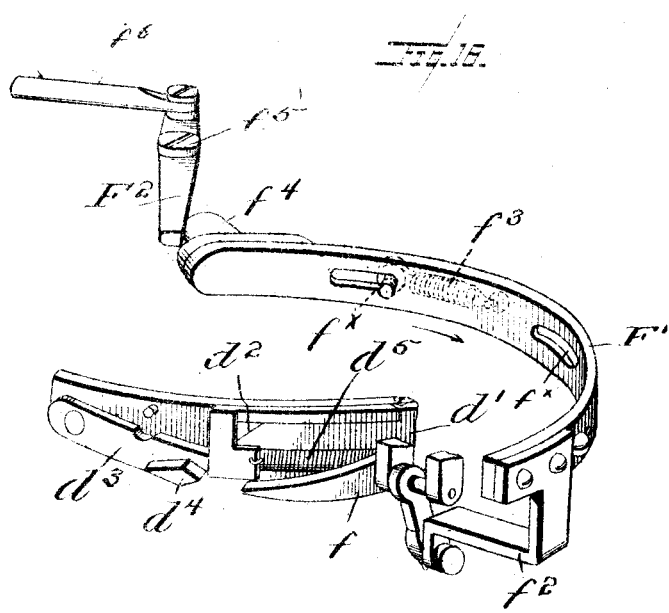

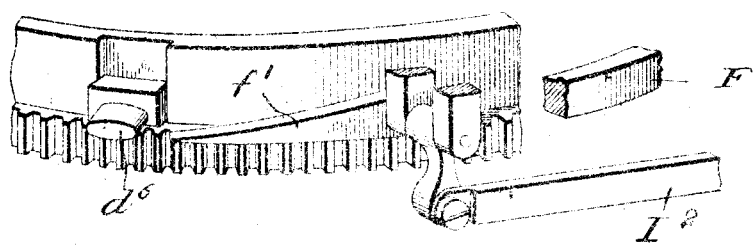
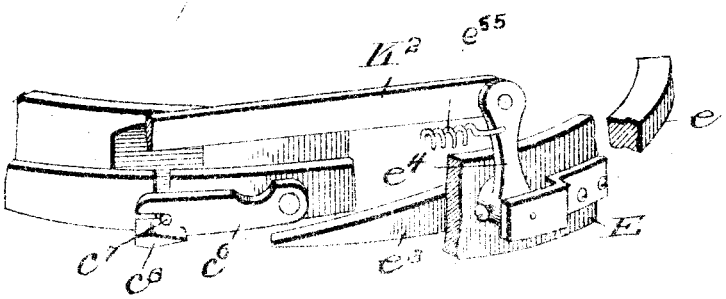
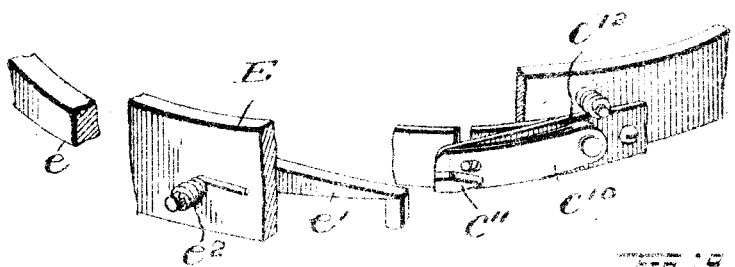

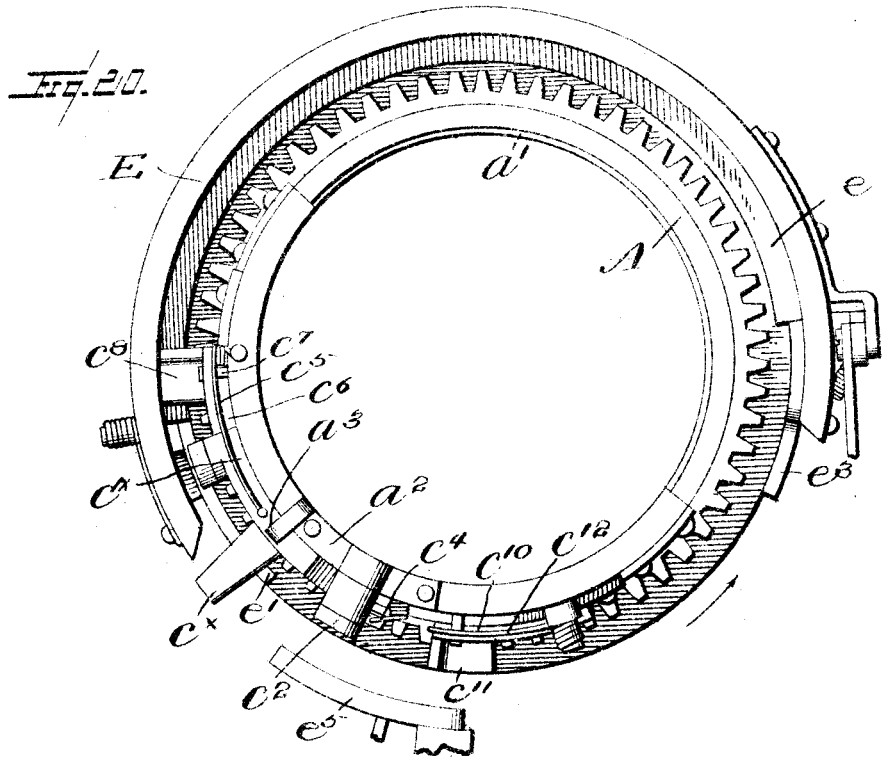
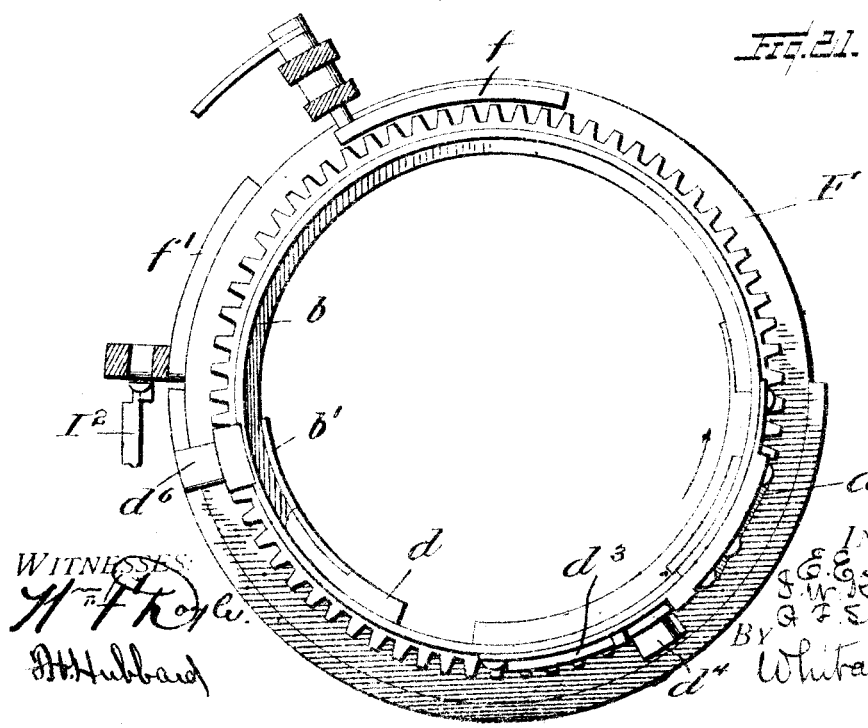

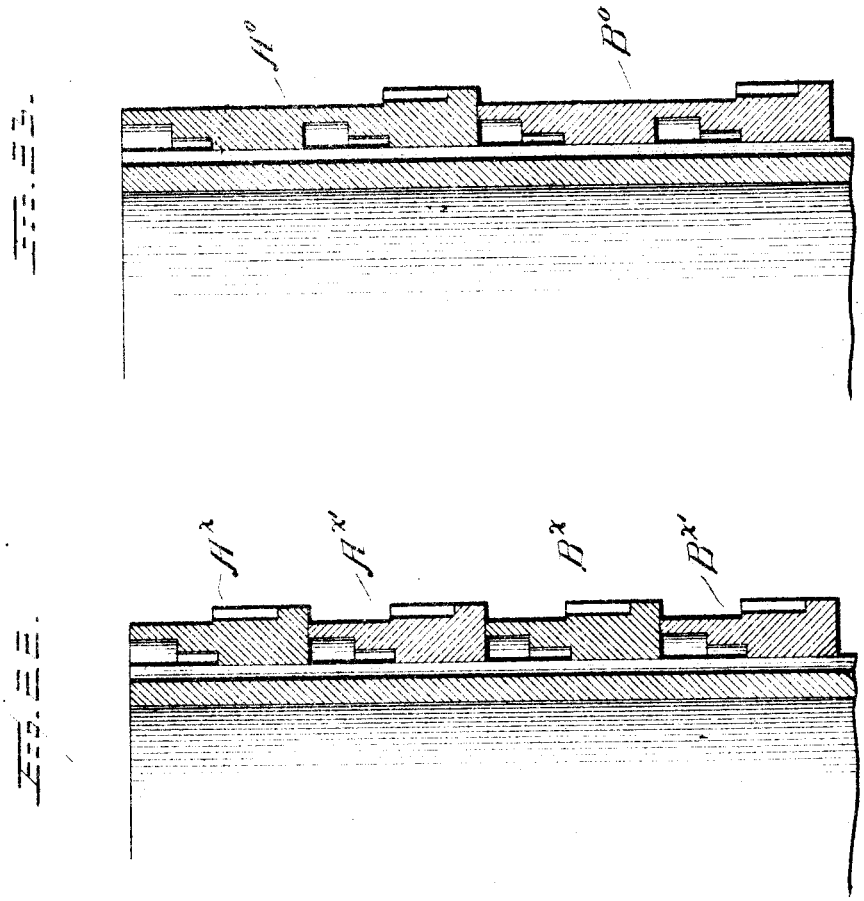

EDWARD E. KILBOURN, ISAAC W. KILBOURN, AND GEORGE F. SMITH, OF NEW BRUNSWICK, NEW JERSEY, ASSIGNORS TO THE INTERWOVEN MILLS, INC.

CIRCULAR-KNITTING MACHINE.

1,066,734.  Specification of Letters Patent.  Patented July 8, 1913.

Application filed October 1, 1904. Serial No. 226,773.

*To all whom it may concern:*

Be it known that we, EDWARD E. KILBOURN, ISAAC W. KILBOURN, and GEORGE F. SMITH, citizens of the United States, residing at New Brunswick, in the county of Middlesex and State of New Jersey, have invented certain new and useful Improvements in Circular-Knitting Machines; and we do hereby declare the following to be a full, clear, and exact description of the invention, such as will enable others skilled in the art to which it appertains to make and use the same.

Our present invention relates to the art of knitting and more particularly to the class of circular knitting machines. It consists of an improved circular knitting machine wherein are embodied certain new constructions and combinations of parts whereby new and desirable results are produced.

In the accompanying drawings we have illustrated one form in which we have contemplated embodying our said invention and the same is disclosed in the following description and claims.

In the drawings, Figure 1 is a rear elevation of an automatic knitting machine with our invention applied thereto. Fig. 2 is a view in elevation of the left end of such machine. Fig. 3 is a top or plan view of the lever engaging the pattern cylinder. Fig. 4 is a side or end view of the same. Fig. 5 is a top view of the stationary guide coacting with said lever. Fig. 5½ is a perspective of the device for lifting the said lever. Fig. 6 is a view of the pattern wheel and connections for controlling the cams of the cam cylinders isolated from the machine. Fig. 7 is a top or plan view of the pattern cylinder and connections. Fig. 8 is a rear view of the said pattern cylinder and connected devices. Fig. 9 is a view of the pattern cylinder viewed from the left end of the machine. Fig. 10 is a view of the pattern wheel and coöperating devices viewed from the front of the machine. Fig. 11 is a view of the interior of the upper cam cylinder developed in a straight line. Fig. 12 is a similar view of the exterior of such cylinder. Fig. 13 is a similar development of the interior of the lower cam cylinder. Fig. 14 is a like view of the exterior of the lower cam cylinder. Fig. 15 is a detail of the cam plate and connections for moving the drop stitch cam of the upper cam cylinder. Fig. 16 is a like view of the cam plate for moving the drop stitch cam of the lower cam cylinder. Fig. 17 is a like view of the cam plate for moving the tuck stitch cam of the upper cam cylinder. Fig. 18 is a like view of the cam plate for moving the tuck stitch cam of the lower cam cylinder. Fig. 19 is a like view of the cam plate for moving the supplemental riser cam for the upper cam cylinder for reciprocating work. Fig. 20 is a plan view showing the relation of the cam plates to such cylinder. Fig. 21 is a like view showing relation of the cam plates to the lower cam cylinder. Figs. 22 and 23 are partial sectional views showing modifications of the cam cylinders.

In the knitting of seamless hose of the open or lace work pattern, it is desirable to have open or lace work begin below the top of the leg of the stocking so that in case of full hose, a strong hem or welt can be secured, and in both full and half hose it is desirable that a strong and durable union at the toe may be readily made. It is also desirable to knit the open or lace work on the back of the leg of the stocking, and yet be able to knit the heel and bottom of the foot and toe of the stocking of solid plain knitting and to knit solid plain knitting on the top of the foot of the stocking before reaching the toe, so that there shall be solid plain knitting on both sides of the closure near the toe of the stocking. These results we accomplish by the improvements herein set forth and we also are enabled to knit drop stitch open work, lace work and solid plain knitting in any order or in such proportions as may be desired; to change on the back of the leg to solid plain knitting when desired without changing the work on the front of the leg of the stocking; and we are also able to knit a different pattern of open or lace work on the back of the leg from that on the front of the same. We can also knit tuck stitch, open lace work or solid plain knitting in any order or sequence upon the leg and can knit a different pattern of such various stitches upon the back from that knit upon the front of the leg of the stocking.

The features of novelty which constitute our present invention are here shown as applied to the type of automatic circular knitting machine shown and described in the patent to E. E. Kilbourn No. 669,730 granted Mar. 12, 1901, and his earlier Patent No. 679,281 July 23, 1901, and we prefer to use our devices when applied to such a machine but we desire it to be understood that the principle of our invention and many of its details can be used in connection with other forms of knitting machines.

The knitting machine to which our novel features of construction are applied is provided with two cam cylinders, each actuating and controlling approximately one-half of the needles of the needle cylinder. The upper cam cylinder in this instance actuates the needles for knitting the rear half of the leg of the stocking and the lower cam cylinder actuates the needles for knitting the front half of the leg of the stocking.

In Fig. 1, A indicates the upper cam cylinder and B the lower cylinder. The construction and arrangement of the cams of cam cylinder A are shown in Fig. 11, while Fig. 13 shows the cams of cam cylinder B.

In Fig. 11, C is the knitting cam which is fixed and immovable. The side of this cam next to the interior wall of the cam cylinder is recessed to receive the sliding cam C'. This cam has a projection which extends outwardly through a slot in the cam cylinder and to this projection is secured the plate $c$ which is provided with a pin $c'$. The pin $c'$ is engaged by the bifurcated end of a short lever $c^2$, see Fig. 12, pivoted to a plate $a^2$ secured upon the upper edge of the cam cylinder. The lever $c^2$ is provided on one side with the cam lug $c^3$ and has its opposite side engaged by the free end of a spring $c^4$ whose opposite end is secured to the cam ring. On the side of the lever $c^2$ which is provided with the cam lug $c^3$ is the lever $C^x$ which is pivoted to the cam ring, or to some part rigidly connected thereto. The free end of this lever normally rests above the cam projection $c^3$ and is provided with an outwardly extending projection $c^x$. A spring $c^5$ bears upon the free end of the lever $C^x$ and tends to press the same downward and to hold it down when in a depressed position. By pressing the lever downward, its free end engages the cam lug $c^3$ and forces the free end of the lever $c^2$ to the right as shown in Fig. 12 and moves the slide $c$ and cam $C'$ to the right or to the position shown in Fig. 11. When forced to this position the lever $C^x$ becomes a lock holding the lever $c^2$ and cam $C'$ in the positions shown in Figs. 11 and 12 until the lever $C^x$ is raised to its upper position and the spring $c^5$ tends to hold the lever from accidental displacement. The plate $a^2$ is provided with a lug $a^3$ to engage the lever $C^x$ and limit its upward movement.

The needles which knit the back of the leg and the heel, bottom of the foot and toe of the stocking are themselves or their jacks provided with nibs which are acted upon by the cam C of this cam cylinder. The nibs of these needles are of three lengths. The shortest normally rest upon the ledge $a'$. In this position the latches of the needles are below the loop upon the needle, and when the nib engages the cam C the needle is depressed but fails to cast off by reason of the latch closing upon the loop.

The nibs of the remaining needles normally rest upon ledge $a$. The nibs of these needles are of two lengths, a part having nibs long enough to engage the cam C' when in the position shown in Fig. 11, the others having a shorter nib which will only engage the cam C. Of these needles those having the shorter nibs do not engage the cam C' and at every revolution of the machine knit a plain stitch.

The machine preferably knits with what is termed a short lead, that is, with the thread guide but a short distance in advance of the knitting cam, or the knitting point. These needles take the thread at about the point $x$ and are immediately drawn downward to make the stitch. The other, and longest nibbed needles before reaching the point $x$, when the cam C' is in the position shown in Fig. 11, engage such cam and are drawn downward before the thread guide has reached the point at which such needles would normally take the thread and continue to move downward below the cams C' and C casting off the loops, if any, that may be upon them. Such needles so long as cam C' is in the same position, continue to engage the cam C' and do not take the thread though otherwise going through the movements of knitting.

The needles having the shortest nibs and which said nibs normally rest on ledge $a'$ are at such height that the thread will be laid against such needles below the hook of the same on each revolution of the machine, but as the latch is below the loop on the needle they will not knit when depressed by the cam C. When it is desired to have such needles knit, their nibs will be raised to the level of the ledge $a$ by the cam $C^2$. This cam when in its depressed position will have the apex of the cam on a level with or slightly below the ledge $a'$. When it is desired to have these needles knit the cam $C^2$ is raised until the apex of the same is level with the ledge $a$. In this position the needles will be raised and the latches of the same brought above the loop and threads on such needle and such needle will then take the thread at the point $x$ and knit a stitch locking the threads that have been laid below its hook, thereby forming tuck stitch knitting.

The cam $C^2$ is connected with a block sliding in a guide way in the cam cylinder and such block is operatively connected with the lever $c^6$. In this instance the said block is provided with a pin $c^7$ which engages with the bifurcated end of the lever $c^6$. This lever is provided with an outwardly extending projection $c^8$ by which the lever is moved to raise or lower the cam $C^2$. When the cam $C'$ is moved behind the cam $C$ and the cam $C^2$ is maintained in its elevated position, the machine will when revolved, knit solid plain knitting with all the needles actuated by the upper cam ring. When it is desired to reciprocate the cam cylinder to produce reciprocating knitting, another cam $C^3$ of like construction will be raised to the level of the ledge $a$. This cam is raised and lowered by a lever $c^{10}$ provided with a projection $c^{11}$, similar to the lever for operating the cam $C^2$. A spring $c^{12}$ bears upon the upper side of the lever $c^{10}$ and tends to maintain it in its lower position.

The arrangement of cams in the lower cam cylinder B is simpler, for as the needles operated by this cam cylinder do not knit during reciprocating knitting, provision for such knitting is omitted. This cam cylinder is provided on the inside with the knitting cam D, which like the cam C of the upper cam cylinder may engage all of the needles provided with nibs for this cylinder. As in the case of the cam cylinder A, the needles of this cam cylinder are divided into three classes having nibs of different lengths. The shorter nibs are normally raised by the riser cam $d$ to the height only of the ledge $b'$. This does not raise the latches above the loops upon the needles, and as the thread guide and cam D approach these needles the thread is laid across the needles below the hook, the cam D then depresses them but owing to the latch being below the loops on the needles, the needles do not cast off. The other needles are provided with nibs of different lengths but both are raised by the riser cam to the height of the ledge $b$ in which position the latches are above the needle loops. The cam D is directly below the cam C of the upper cam cylinder A and as D approaches these needles they take the thread at the same point and are forced downward to knit the ordinary plain stitch.

The cam D is provided with an auxiliary cam $D'$ bearing the same relation to the cam D that the cam $C'$ does to the cam C. This cam is shown in Fig. 13 in its withdrawn or retracted position. It has a projecting part extending outward into a slot in the wall of the cylinder B, and to this projection is secured the slide $d$ moving in a guide way on the outside of the cylinder. This slide is provided with the cam faced end $d^2$. A lever $d^3$ is pivoted to the cylinder having its free end normally above the cam faced end of the slide $d'$ and said lever is provided with an outwardly extending lug $d^4$. A spring $d^5$ is so connected to the slide $d$ as to force the slide beneath the free end of the lever $d^3$, when such lever is in its raised position. In this position of the lever and slide the cam is in its retracted position behind cam D. By forcing the free end of the lever $d^3$ downward it engages the cam face of the slide $d'$ and forces it to the right (see Fig. 14) and moves the cam $D'$ out from behind the cam D and into the position shown by dotted lines. When forced to this position the cam and lever are locked as at such time the spring $d^5$ tends to move the lever downward. In this position the cam $D'$ will engage the longer nibbed needles of the ledge $b$ and begin to depress them before they have taken the thread from the thread carrier. It then moves them downward and causes them to cast off the loops, if any, that may be on them thereby dropping their stitches.

$D^2$ is an auxiliary riser cam which engages only the nibs of the needles which rest on ledge $b'$ and engages these only when in a raised position. This cam is secured to a slide in a vertical guide way in the cylinder, and this slide has a projection $d^6$ extending outwardly beyond the cylinder by which the cam may be raised and lowered. When this cam $D^2$ is in its raised position, and the cam $D'$ is in its retracted position, all of the needles take the thread from the thread guide and knit a course of plain stitches at every revolution of the machine. When the cam $D^2$ is in its lower or inoperative position the needles that are raised only to the height of ledge $b'$ are not raised high enough to bring the latch of the needle above the loop on the needle and the downward movement of such needle by the cam D does not cause it to cast off its loop as the latch closes upon the thread in the hook. The needle is, however, raised to such a position that at every round of the thread guide a thread is laid across the needle below the hook and above the latch.

The needles of the needle cylinder are divided on a line running longitudinally of the machine into two sections, each containing about one-half of the needles of the machine. The section of the needles nearest the front of the machine of that side of the same shown in Fig. 10 are provided with nibs to engage the cam constructions of the upper cam cylinder A, and the needle section that is near the rear side of the machine or that shown in Fig. 1, are provided with nibs to engage the cam construction of the lower cam cylinder B. It will thus be seen that at each rotation of the machine the cams of cylinder A are for approximately one-half of its revolution out of contact with the nibs of the needles that are actuated by it. It is during this period of the revolution of this cam cylinder that the cams are moved from one position to the other.

The cams C', C² and C³ are moved into and out of operative position by cam plates located on stationary parts of the machine, so as to act upon said cams during the period that they are out of engagement with the nibs of their needles. These devices are more particularly shown in Figs. 15, 17, 19 and 20. In order that these cam plates may act each upon its cam without affecting the others, they are mounted in different vertical planes and the pins or projections for engaging with them are made of different lengths to engage therewith. E is a stationary ring or casing which extends wholly or partially around the upper cam cylinder. It extends around the needle section operated by the upper cam cylinder and a little beyond each edge of the section. This casing E is provided on its inner side with a ledge or flange $e$ extending inwardly toward the cam cylinder. A cam plate $e'$ is pivoted in line with this ledge or flange and a spring $e^2$ serves to normally keep it in a depressed position. The inner side of this cam plate is flush with the inner face of the flange $e$. At the other end of the flange is pivoted the cam plate $e^3$. This cam plate is of half the thickness of the flange $e$ and is so mounted that its outer side is against the inner side of the casing E, and therefore, extends inwardly only half the width of the flange.

The cam C³ is to be operated only during reciprocating work. The projection $c^{11}$ to operate such cam is of such length that it does not engage with the cam plate $e^3$ and as the cam cylinder is rotated in the direction shown by the arrow in Fig. 20, the projection $c^{11}$ passes under the flange $e$. This flange, as will be seen, prevents the accidental shifting of the cam during the period that the active cams of the upper cam cylinder are in engagement with their needles as during such period the projection $c^{11}$ is beneath the flange $e$. On leaving this flange the projection $c^{11}$ passes under the pivoted cam plate $e'$ which rises and permits the projection to pass, after which the cam plate is thrown down to its normal position by the spring $e^2$. As long as this operation is continued, the cam C³ therefore remains in its depressed position.

When reciprocating work is begun on the first movement of the cam cylinder in a direction the reverse of its regular rotation, the projection $c^{11}$ engages the cam plate $e'$ and is raised upon the flange $e$ which holds the lever $c^{10}$ and the cam C³ in their elevated positions. During this movement the cam C³ is in rear of the cam C and the needles after knitting are all raised to the level of the ledge. As soon as the projection $c^{11}$ leaves the ledge $e$ the lever $c^{10}$ is depressed by the spring bearing upon the same. On the return movement the cam C³ is not needed and the projection $c^{11}$ passes below the ledge $e$ and cam plate $e'$ and on its next movement it is again raised by the cam plate $e'$ and held during the period that it is required to be raised by the ledge or flange $e$.

The cam plate $e^3$, see Fig. 17, is rigidly secured to its pivot and on the outside of the casing E, such pivot has the arm $e^4$ secured thereto; this arm is connected by connections as hereafter set forth, with pattern mechanism which control the position of the cam plate and the cam C². When the arm $e^4$ is moved and the point of the cam plate is raised, the projection $c^8$ of lever $c^6$ will engage the underside of the cam plate and the lever and cam C² will be depressed. When, however, the arm $e^4$ is moved so that the point of the cam plate is depressed, the projection $c^8$ engages the upper side of the cam plate and the lever and cam C² are raised. The projection $c^8$ after leaving the cam plate rests upon the ledge or flange $e$ and the cam is thereby held in its elevated position. As the flange extends over the needles engaged by this cam the pressure of the needles upon it can not move the cam from its position. While the projection $c^8$ is passing from one end of the flange $e$ to the other the cam is free from all pressure which would serve to move it downward and it, therefore, remains in position. Should it be accidentally moved, however, the cam plate $e^3$ would again raise it before it would engage the needles. During reciprocating work, cam plate $e^3$ is held in position to raise the cam C². Such cam in case of accidental downward movement would be raised by cam plate $e^3$ when moving in one direction and by cam plate $e'$ when moving in the other. In either case the cam would be held up by the ledge or flange $e$. A further cam plate $e^5$, see Figs. 15 and 20, is provided for moving cam C' into and out of operative position. This cam plate has an arm $e^6$ secured to its pivot and this arm is connected with pattern mechanism by which it is controlled. When this cam is turned and its point raised, the projection $c^x$ will engage the underside of the cam plate and the lever C^x will be depressed, moving the cam C' into operative position. When this cam plate $e^5$ is moved downward so that the projection $c^x$ of the lever C^x engages the upper side of the same, the lever C^x will be raised and the spring $e^4$ will draw the cam back into inoperative position. The projection $c^x$ is of such length that the cam plate $e^5$ is placed out of the path of the projections which actuate the cams C³, C² and therefore, the cams C³ and C² are never affected thereby, as the projection $c^x$ is in a plane above that of the projections $c^3$ and $c^8$, cam C' is not affected by the other cam plates for this cylinder.

For controlling the cams D' and D² of the lower cam cylinder, certain other cam plates are provided. The needles actuated by the lower cam cylinder occupy the opposite half of the needle cylinder from those actuated by the upper cam cylinder, therefore, the cam plates for moving cams D and D² are on the opposite side of the machine from those which control the cams of the upper cylinder.

$f$ is a cam plate for moving the cam D'. This cam plate is pivoted and the pivot is provided with a crank arm by which the plate may have its free end turned upward or depressed. When it is raised the projection $d^4$ will engage the underside of the same, the lever $d^3$ will be forced downward and the cam D' moved into operative position, and when depressed the same projection will engage the upper side of the cam plate and lever $d^3$ will be raised permitting the spring $d^5$ to withdraw cam D' from operative position.

An inwardly extending flange or ledge F is formed on the inner side of the ring or casing wholly or partially surrounding the lower cam cylinder. This flange extends around the needles actuated by the lower cam cylinder, and the cam plate $f$ is located about midway between the ends of this flange, and thus moves cam D' when the cams of the cylinder are out of contact with the ribs of their needles. The cam plate $f'$ is employed to move the cam D². This is shown at the left in Fig. 21 with its free end extending toward cam plate $f$ while the other end is pivoted close to the end of flange F at that side of the machine. The pivot of this cam plate $f'$ is also provided with a crank arm by which the cam plate may have its free end moved upward or depressed. When it is depressed the projection $d^6$ of cam D² will engage the upper side of the cam plate and the cam will be raised into operative position and when the free end of the cam plate $f'$ is raised, the said projection will engage the underside of the cam plate and the cam will be depressed.

The cam plate $f'$ is placed farther away from the cam cylinder than cam plate $f$, and is in line with the ledge or flange F. When the cam D² is raised the projection $d^6$ rises upon the ledge F and the cam is held in its upper or operative position, around the half circle of needles controlled by the lower cam cylinder. The projection $d^4$ of the cam D' is of such length that it will not engage with the cam plate $f'$ or with the ledge or flange F. The projection $d^6$ being longer than the projection $d^4$ may sometimes come in contact with the cam plate $f$, but as the cylinder moves in the direction of the arrow in Fig. 21, it will afterward come into engagement with the cam plate $f'$ and be put in proper position thereby, before it reaches the needles of the cylinder. It will thus be seen that it is only necessary to provide pattern mechanism to control the cam plates $e^3$, $e^5$, $f$ and $f'$ to effect such movements of the cams in the two cam cylinders as will produce the pattern of work desired. In the present instance, these cam plates are controlled by the following instrumentalities.

As shown in Fig. 1 the machine near one end is provided with a pattern cylinder G' which cylinder is mounted on a shaft G, extending transversely of the machine. The pattern cylinder is provided at one end with the ratchet G² by which it is revolved, through pawl $g$. This pawl has its upper end hooked and engages a cam or eccentric $j'$ on the transverse shaft J through which motion is conveyed to the cam cylinder and is caused to have one reciprocation and move the pattern cylinder the distance of one tooth of the ratchet at each revolution of the cam cylinders. This pattern cylinder is provided with a spiral groove extending from one end to the other of the cylinder and in such groove, the cylinder is provided with holes $g'$ to receive pins $g^2$.

A bracket G³ is secured to the left end of the frame of the machine, see Figs. 2, 7 and 9. This bracket supports a rod G⁴ rigidly secured to said bracket. A lever G⁵ provided with an elongated hub $g^3$ is pivoted upon the rod G⁴ so that it is free to swing and slide upon said rod. The free end of the lever has a downwardly extending projection of such width as to enter the groove of the pattern cylinder. The free end of the lever G⁵ is extended laterally in both directions and at each end is provided with an upwardly extending ear in which is rigidly mounted a rod $g^4$. A rock shaft I is mounted in bearings and extends longitudinally of the machine. This rock shaft is provided with an arm $i$ extending outward or rearwardly from the machine. A link I' has its upper end pivotally connected with the outer end of the arm $i$, and its lower end is provided with an aperture through which the rod $g^4$ passes freely. The link I' engages the slot of the slotted guide L² through which it is free to move in a vertical direction, but which holds the link from moving toward or away from the machine. The rock shaft is provided with a spring $i'$ (see Fig. 1) which tends to turn said shaft in a direction to maintain the projection of the lever G⁵ down upon the bottom of the groove of the pattern cylinder or upon the top of pins $g^2$ in such groove. The rock shaft I is also provided with an upwardly extending arm $i^2$. The upper end of this arm is provided with an aperture through which passes a rod I² which is connected with the crank arm of cam plate $f'$ for controlling cam D². As the spring $i'$ tends to turn the shaft I, so as to move the arm $i^2$ outward, such action tends to draw the rod $I^2$ outwardly and maintain the cam plate with its free end depressed and keep the cam $D^2$ in its operative position. When the downwardly extending projection of the arm $G^3$ is engaged by a pin $g^2$ the arm is raised and through link $I'$, arm $i$, rock shaft $I$, arm $i^2$ and rod $I^2$ the free end of the cam plate will be raised and the cam $D^2$ depressed into inoperative position.

As before stated, the cams of the lower cam cylinder coöperate only with one-half of the needles of the needle cylinder, the needles on the front half of the stocking. In order to effect a like control of the cam plate $e^3$ for moving cam $C^2$ of the upper cam cylinder, a rod $K^2$ is pivotally connected with the crank arm $e^4$ of the cam plate $e^3$ which extends rearwardly and passes through an aperture in the upper end of an arm or lever $K'$ pivotally mounted on a rock shaft $K$, mounted on the same side of the machine and parallel with shaft $I$. To this lever $K'$ is pivoted the bell crank lever $k$, provided with the shoulder $k'$. The outer end of the bell crank lever $k$ normally rests on the upper end of an arm $i^3$ rigidly connected with the rock shaft $I$. The cam plate $e^3$ is normally held in its depressed position by a spring $e^{55}$. When the rock shaft $I$ is turned to effect the raising of the free end of the cam plate $f'$ the arm $i^3$ engages projection $k'$ on the bell crank lever and the lever $K'$ is moved inward moving the rod $K^2$ and raising the free end of the cam plate $e^3$. When the arm $G^3$ passes off from one of the pins $g^2$ and the arm drops to the bottom of the groove of the pattern cylinder the spring $i'$ retracts the rod $I^2$ while the spring $e^{55}$ moves the rod $K^2$ and the lever $K'$ outwardly, the free ends of the cam plates will thus be depressed and the cams $D^2$ and $C^2$ raised to operative position.

When it is desired to permit the cam $D^2$ to act independently of the cam $C^2$, the bell crank lever $k$ is raised out of contact with the arm $i^3$. To accomplish this the shaft $K$ is provided with an arm $k^2$ so placed on said shaft that the outward movement of the arm $k^2$ will engage the depending arm of the bell crank lever $k$ and raise the other arm of such lever so that its projection $k'$ will not be engaged by the arm $i^3$ of the shaft $I$. This movement of the shaft $K$ and its arm $k^2$ is in this instance effected by a pattern wheel $H$ on the opposite or front side of the machine. The shaft $G$ on which the pattern cylinder is mounted extends across the machine from rear to front and at its front end is provided with a pinion $g^x$ which meshes with a gear wheel $H'$ connected to and moving with the pattern wheel $H$ (see Fig. 7).

The relative sizes of the pinion and gear are such that the projection of the lever $G^3$ will traverse the entire length of the groove in the periphery of the pattern cylinder during the knitting of a single stocking and the pattern wheel will during the same time, make one complete revolution.

The shaft $K$ extends beyond the left end of the machine and is there provided with a crank arm $k^3$. This crank arm is connected by a link $k^4$ with an arm $l$ extending outwardly from a shaft $L$ which is mounted in bearings transversely of the machine and this shaft has a downwardly extending arm $l'$ lying in the plane of the tread $h$ of the pattern wheel, so that the arm $l'$ will be engaged by risers on the said tread. The tread $h$ of the pattern wheel is, therefore, provided with a riser for engaging the arm $l'$ at the point at which it is desired to have the cam $C^2$ raised, and to have the cam act independently of the cam $D^2$ of the lower cam cylinder and this riser is made long enough to continue this operation for such period as is desired.

Upon an outwardly extending flange of the casing surrounding the lower cam cylinder is mounted the curved slide $F'$. In shape it conforms to the flange upon which it is mounted and it is sustained upon the flange by two screws passing through two slots $f^x$ $f^x$ in said slide. The slide is thus mounted for a movement to the extent of the slots. This slide extends approximately half way around the cylinders and to the end near the front of the machine is secured the depending arm or bracket $f^2$, the lower end of which extends inwardly and is operatively connected with the crank arm of the cam plate $f$. A spring $f^3$ is connected with this slide and tends to draw the same toward the rear of the machine, in which position the cam plate $f$ is depressed and the arm $d^3$ maintained in its elevated position, allowing the spring $d^5$ to draw the cam $D'$ into its recess behind cam $D$, and consequently out of operative position. The rearward end of the slide is provided with an outwardly extending projection $f^4$, and it will be at once seen that when pressure is applied thereto in the direction of the arrow in Fig. 18 the crank arm of the cam plate $f$ will be raised and the lever $d^3$ will be depressed on the next revolution of the machine. The movement of this slide is effected at the proper times by the lever $F^2$ pivoted at $f^5$. To the shorter arm of this lever is pivoted the rod $f^6$ which passes through an aperture in an arm $f^7$ of a vertically disposed rod or shaft $F^3$, which is so mounted in its bearings as to be free to rotate or slide therein. The rod or shaft $F^3$ is near its upper end provided with an arm $f^8$ provided at its outer end with the depending pin $f^9$. The outer end of this arm extends outward over a disk $m$ on the shaft $M$, which gives motion to the cam cylinders, This disk is similar to a disk shown in the Patent No. 669,730 hereinbefore referred to. This disk has a circular flange extending upwardly from the upper side of the disk. A part of this flange is hinged to open outwardly forming a gate and is normally closed by a spring. A web extends from the hub of the disk to the gate, of such shape as to act as a cam to force anything coming in contact therewith out through the gate. The spring $f^3$ drawing the slide F' toward the rear of the machine forces the projection $f^4$ against the inwardly extending end or arm of the lever $F^2$ and turns the rod or shaft $F^3$ so as to bring the free end of the arm $j^8$ and pin $j^9$ above the disk $m$.

The rod or shaft $F^3$ is maintained in its uppermost position by the arm $f^{10}$ of a rock shaft $F^4$, the rod $F^3$ resting upon the flattened outer end of said arm. The rock shaft $F^4$ is mounted transversely of the machine above the bed of the same and has an arm $f^{11}$ at its opposite end. This arm is connected by a link $f^{12}$ with a bell crank lever $F^5$ which has its other arm bearing against the inner edge of the ring or annulus $H^2$ on the pattern wheel H. The weight of the rod and the parts connected therewith serves to keep the free arm of the bell crank lever $F^5$ against the inner side of the ring $H^2$. Risers of such extent as may be desired may be secured to the inner side of this ring. So long as a riser bears upon the free end of the bell crank lever the rod or shaft $F^3$ will be held in its uppermost position as shown in Fig. 6, but when such riser moves out from under the arm of the bell crank lever, the weight of rod or shaft $F^3$ will force down the arm $f^{10}$ and this will cause the pin $f^9$ to drop down within the flange of the disk $m$. As the shaft M revolves the web within the flange will be brought into contact with the pin $f^9$ and the same will be forced out through the gate to the outside of the disk. This action turns the rod or shaft $F^3$ causing the arm $f^7$ to draw upon the lever $F^2$ and move the slide F' so as to elevate the free end of the cam plate $f$ and thereby force the cam D' into operative position. So long as the bell crank lever $F^5$ is uneffected by a riser upon the ring $H^2$ the cam D' will remain in operation, but as soon as it again engages a riser the rod or shaft $F^3$ will be raised and the spring $f^3$ will restore the parts to the position shown in Fig. 6.

A rod E' is connected to the crank arm $c^6$ of the cam plate $e^5$. This rod passes through an aperture in the end of an arm $c^{10}$ projecting from a frame or bracket $E^2$ that is pivotally mounted on the upright rod or shaft $F^3$. A lever $e^{12}$ is pivoted to the bracket $E^2$. One end of this lever is provided with the upwardly extending pin $e^{13}$ and a spring $e^{11}$ is connected with said bracket in such a way as to tend to throw the end of the lever $e^{12}$ provided with the pin $e^{13}$ toward the shaft M and beneath the disk $m$. This disk has the lower side of the same constructed with the flange gate and cam web corresponding to the several parts on the upper side of the disk. The other end of the lever $e^{12}$ is connected by a link $E^3$ with an arm $E^4$ which is connected to one end of the rock shaft $E^5$ mounted in much the same manner as rock shaft $F^4$ and in close proximity thereto. The other end of the shaft $E^5$ is provided with the crank arm $e^{14}$ and this crank arm is connected by a link $E^6$ to one arm of the bell crank lever $E^7$. The other arm of the bell crank lever is in position to engage the inner face of a ring $H^3$ of the pattern wheel H. This ring is constructed to receive risers $h'$. The shaft $E^5$ is provided with the spiral spring $e^{15}$ (see Fig. 2) which is connected with the shaft $E^5$ in such a way that it tends to force the bell crank lever $E^7$ into contact with the ring $H^3$ or its risers, and to throw the free end of lever $e^{12}$ upward so as to bring the pin $e^{13}$ within the downwardly extending flange of the wheel $m$. So long as the bell crank lever $E^7$ engages a riser on the inside of the ring $E^3$, the free end of the lever $e^{12}$ is below the disk $m$ and is maintained in a position near the shaft M by the spring $e^{11}$ acting on the bracket $E^2$, but when the bell crank lever $E^7$ passes from a riser or risers on the ring $H^3$ and moves against the inner side of said ring the spring upon the rock shaft $E^5$ moves the shaft to cause the arm $E^4$ to draw down one end of the lever $e^{12}$ and raise its opposite end bringing the pin $e^{13}$ within the flange on the lower side of the disk $m$. The rotation of that disk brings the pin at the proper time within the operation of the web and gate and the pin $e^{13}$ is forced outward swinging the bracket $E^2$ and causing its arm $c^{10}$ to move the rod E' and raise the free end of the cam plate $c^5$. So long as the bell crank lever $E^7$ remains in this position the cam plate $e^5$ will be in the raised position and the projection $c^3$ of the lever $c$ will engage the under side of the cam plate and the cam C' will be moved into operative position, and when the bell crank lever again engages a riser the pin $c^{13}$ will be lowered out of engagement with the disk $m$ and the spring $e^{11}$ will move the bracket $E^2$ so as to carry the pin under the disk $m$ toward the shaft M and the arm $e^{10}$ will move the cam plate to bring the free end of the same into its lowest position and the cam C' will be returned to its inoperative position.

It will be seen that by the employment of the disk $m$, the cams D' and C' are brought into action at a certain definite period of the rotation of the cam cylinders. This avoids the necessity of absolute accuracy in the adjustment of the pattern wheel and its connections with the parts engaging the disk $m$. As the disk accurately times the point in the revolution of the cam cylinders at which the drop stitch cams are changed from inoperative to operative position it has been termed a "timing device."

It will be seen that in the connection of the rods $E'$, $f^6$, $K^2$ and $I^2$ with their actuating arms a spring is interposed on one side of the actuating arm between the arm and a cotter passing through the rod. This is done to give a yielding motion in one direction, for the purpose of avoiding breakage. It also avoids the necessity of adjusting the operative parts to so nice a degree of adjustment as would otherwise be required. A spring may be employed on each side of the arm instead of on one side only if preferred. The employment of the disk $m$ and these elastic connections very greatly reduces the cost of construction.

In the operation of the machine, the lever $G^5$ is moved by the spiral groove from one end of the pattern cylinder $G'$ to the other, the hub of the lever sliding on the rod $G^4$ and the link $I'$ sliding on the rod $g^4$, the guide $L^2$ holding the link from moving out of its proper vertical plane under the friction with the rod $g^4$. It is intended that this movement shall take place during the knitting of one entire stocking and that the pattern wheel shall during the same time make one entire revolution. At the end of its traverse the lever $G^5$ must be returned to the end of the pattern cylinder from which it started in order to give the necessary movements for the succeeding article. During its traverse from the inner to the outer end of the pattern cylinder the movement of lever $G^5$ has been against the force of a coiled spring $G^6$ that gears upon a lever $G^7$ which loosely engages with a part of the lever $G^5$. The shaft $I$ is provided with an arm $i^4$ extending in an opposite direction from the arm $i$. This arm is connected by link $G^8$ with an arm $g^5$ of shaft $G^9$ mounted transversely of the machine and provided at its opposite end with an arm $g^6$ lying in the plane of the tread $H^4$ of the pattern wheel $H$. This tread is provided with a projection $h^2$ which at the end of the cycle of movements necessary to complete a stocking engages the arm $g^6$ and turns the shaft $G^9$ so as to draw the link $G^8$ and arm $i^4$ downward turning shaft and raising arm $i$ and link $I'$, lifting the lever $G^5$ clear of the groove of the pattern cylinder. When thus raised the force of the spring $G^6$ draws the lever $G^5$ back to the place of starting. When the shaft $I$ is thus moved the arm $i^2$ moves the rod $I^2$ so as to raise the free end of the cam plate $f'$, but as this takes place during the period in which the lower cam cylinder is stationary, that is, at the close of the narrowing and widening movements to form the toe of the stocking and while the bell crank lever $K$ is raised out of the path of the arm $i^3$ and before the resumption of circular knitting, the operation of the machine is not affected thereby.

The pattern wheel, as in the Patents Nos. 669,730 and 679,281, in which it is termed a "cam wheel," regulates most of the movements of the machine.

The pawl $g$ for operating the ratchet $G^2$ is of peculiar construction. In cross section the body of the same is of inverted U-shape. This shape permits the pawl to be sufficiently secured in position by having its curved upper end placed upon the cam by which it is to be operated, such cam being narrow enough to permit the cam to lie on the depending or inwardly extending sides of the portion of the pawl engaging it. The lower end of this pawl is slotted and a bar or web extending from one side to the other engages the ratchet teeth. The angle of inclination is such that the downward movement of the pawl is effected by gravity alone.

On the end of the shaft $G$ is movably mounted the arm $G^{10}$ secured by the collar $G^{11}$, Fig. 7. To this arm is pivoted a link $g^7$, the upper end of which is curved after the manner of the pawl $g$, but this link is quite narrow and lies between two disks $g^8$, $g^9$ between which is the cam $g^{10}$, see dotted lines in Fig. 8. At every revolution of the shaft $J$, the link $g^7$ and arm $G^{10}$ are moved the extent of the eccentricity of the cam $g^{10}$ when not otherwise controlled. To the arm $G^{10}$ is pivoted the pawl $g^{11}$, which passes through the slot in the lower end of the pawl $g$ and engages the ratchet $G'$. The upper or outer end of the arm $G^{10}$ is provided with a pin to which is rigidly but adjustably secured an upwardly extending arm $g^{12}$, which normally engages a stop plate $G^{12}$ and limits the backward movement of the arm $G^{10}$.

Upon the rearward end $g^a$ of the hub of lever $G^5$, see Fig. 8, is mounted a split collar $g^b$ secured by screws passing through the flanges $g^c$ $g^d$. The collar $g^b$ is provided with an ear to which is pivoted the stop plate $G^{12}$. A spring $g^e$ connects the stop plate with the underside of the collar $g^b$.

The stop plate normally limits the backward movement of the arm $G^{10}$ and the pawl $g^{11}$ to such an extent that so long as the arm $g^{12}$ engages the face of the plate the pawl $g^{11}$ effects no movement whatever of the ratchet and pattern cylinder. The stop plate is provided with an adjustable extension $g^{13}$ by which the face of the stop plate engaged by the arm $g^{12}$ may be extended or diminished when so desired. This extension $g^{13}$ is provided with a shoulder $g^{14}$. When the arm $g^{12}$ engages the shoulder $g^{14}$ the arm $G^{10}$ and pawl $g^{11}$ are permitted a backward movement sufficient to give the ratchet a movement equal to one tooth.

This adjustment of the face of the stop plate is for the purpose of enabling the machine to knit stockings of different lengths. The actuating cam of pawl $g$ is so located on its shaft that during reciprocating knitting the pawl $g$ effects no movement of the pattern cylinder and pattern wheel, while the cam for actuating the pawl $g^{11}$ is so placed on the same shaft that the arm $G^{10}$ and pawl $g^{11}$ are moved during both circular and reciprocating work when not prevented from backward movement by the stop plate.

The stop plate extension is so adjusted that at the time of the change from circular to reciprocating knitting to knit the toe of the stocking the arm $g^{12}$ will engage the shoulder $g^{14}$ of the extension stop plate. As soon as the knitting of the toe is begun the pawl $g$ will cease to act and the pawl $g^{11}$ will move the ratchet and pattern cylinder one tooth at each reciprocation of the cam cylinder. This will continue until the stop plate has been moved so far that the shoulder $g^{14}$ no longer is engaged by the arm $g^{12}$. The arm $G^{10}$ and the pawl $g^{11}$ are then given the full movement imparted by their actuating cam, which moves the ratchet and pattern cylinder two or three teeth at a time. As this accelerated speed of the pattern cylinder and wheel continues, the riser $h^2$ on the tread $H^4$ of the pattern wheel comes in contact with the arm $g^6$ of the shaft $G^9$ and raises the lever $G^5$ and the same is returned to the point of starting. The riser $h^2$ has but a short bearing surface and as the lever $G^5$ and the stop plate are now above the arm $g^{12}$, the pawl $g^{11}$ continues to move the pattern devices until the arm $g^6$ passes from the riser $h^2$ and the lever $G^5$ drops into the groove of the pattern cylinder. Should the arm $g^{12}$ be beneath the stop plate as the lever $G^5$ moves downward the spring $g^e$ yields and permits the full downward movement of the lever. On the next forward movement of the arm $G^{10}$ the arm $g^{12}$ passes from beneath the stop plate, the spring $g^e$ drawing the stop plate down behind it. The pattern devices are now in position to begin a new stocking and the stop plate prevents any further movement of these devices until the circular work is again begun and they are again actuated by the pawl $g$.

It will be seen that when cams C' and D' are in their retracted position, and cams C² and D² are in their elevated position the machine in operation will produce solid plain knitting. By throwing the cams C' and D' into operative position the needles engaging such cams will drop their stitches and produce drop stitch open work all around the stocking. The needles engaging this cam may be arranged to give the pattern desired. By withdrawing cams C' and D' from action solid plain knitting will be produced and this operation may be repeated at such intervals as may be desired. By throwing the cam D' alone into operation, drop stitch open work will be produced upon the front of the stocking only.

When it is desired to knit lace work with drop stitches therein on the front of the stocking, the needles engaging the cam D' are arranged to produce the drop stitches required. The cam D' is then put in operation and at the same time the cam D² is controlled by the pattern cylinder so that the needles of cam cylinder B having the shorter nibs will not knit for one, two or more courses and then cam D² will be raised and such needles caused to knit for one or two courses.

By arranging the needles of the upper cam cylinder to give the drop stitches desired and connecting shaft K with the shaft I, lace work will be made entirely around the leg of the stocking. The drop stitch work may be made without the tuck stitches and tuck stitches may be made without making drop stitches and tuck stitches may be knit on the back without knitting them on the front and solid plain knitting may be alternated with either of the other forms of stitches as desired.

It is obvious that the tuck stitch cams can be independently controlled by pattern mechanism, if it is preferred. It will also be obvious that in place of dividing the needles into two sections the needles may be divided into four or more sections and that a different pattern may be knit by each section, and the patterns varied in each section as desired. This can be effected either by additional cam cylinders or by providing the cam cylinders with additional cam grooves or tracks, as shown in Figs. 22 and 23. In the latter each of the two cylinders A° and B° are shown as provided with two needle tracks while in Fig. 22 four cylinders A× A× and B× B× are shown for operating the needles.

In knitting certain grades of yarn, it is desirable to knit with what is termed a "short lead," that is with the thread guide but a short distance in advance of the point at which the thread is taken by the needles and knitted. When this is the case, when the section of needles that are stationary during widening and narrowing are thrown out of action, it is desirable to advance the thread guide for circular work a short distance to bring the thread under the hooks of a larger number of needles and more strongly against the needles than when knitting to insure the taking of the thread when circular work is resumed.

In this construction as in the construction of the former patents hereinbefore referred to, the thread guide for circular work is carried by a revolving body N. To this body is attached the arm n' which rotates therewith. On the rod O, which is raised before beginning reciprocating work to open the clutch which connects its driving mechanism with the rotating body N is mounted the arm o, which is at its outer end provided with the cam o'. This cam during circular work lies below the plane of the revolution of the arm n. When the thread guide n is arrested on stopping circular work the arm n' is above the cam o' and on the rod O being raised to open the clutch, the cam o' comes in contact with the arm n' and moves the guide forward, drawing the thread against the needles as before described.

The devices for narrowing and widening to form the heel and toe of the stocking are substantially the same as those of the patents hereinbefore referred to and therefore no description of the same seems necessary.

What we claim and desire to secure by Letters Patent is:—

1. In a knitting machine having means for forming the heel and toe of the stocking, the combination with a pattern cylinder having a spiral pattern track, of a pattern wheel connected with said cylinder for continuous joint movement and means connecting said pattern mechanism with the stitch forming and heel and toe forming devices to cause a single traverse of the spiral track and one revolution of the wheel to control the knitting and heel and toe forming devices in the production of a complete stocking, substantially as described.

2. In a knitting machine having mechanism for making a variety of stitches and forming a complete stocking, the combination therewith of a pattern cylinder having a spiral track and a pattern wheel operatively connected with said cylinder for continuous joint movement, and means connecting said pattern mechanism with the stitch and stocking forming mechanism, to cause the said pattern mechanism by a single traverse of the spiral track and one revolution of the pattern wheel to control the stitch and stocking forming mechanism in the production of a complete stocking, substantially as described.

3. In a circular knitting machine, the combination with the stitch forming mechanism, and narrowing and widening devices, of a pattern cylinder having a spiral pattern track and a pattern wheel operatively connected with said cylinder for continuous joint movement, and means connecting said pattern devices with the stitch forming and narrowing and widening devices for controlling the character of the knitting and the narrowing and widening devices to cause a single traverse of the entire spiral track, and one entire revolution of the wheel to produce the necessary movements of the machine to knit a single stocking, substantially as described.

4. In a circular knitting machine, the combination with the stitch forming mechanism, and narrowing and widening devices, of a pattern cylinder having a spiral pattern track thereon, a pattern wheel operatively connected with said pattern cylinder for continuous joint movement, means intermediate the said pattern cylinder and pattern wheel and the stitch forming mechanism to control said stitch forming mechanism and means intermediate the pattern wheel and the narrowing and widening devices to control the narrowing and widening devices, to cause a single traverse of the spiral pattern track and a single revolution of the pattern wheel to effect the knitting of a single stocking complete, substantially as described.

5. The combination of a pattern cylinder having a spiral pattern groove with a lever having a projection to engage and follow said groove, said lever being mounted to traverse the entire length of said cylinder, and a spring for returning the said lever to the starting point, substantially as described.

6. The combination with a pattern cylinder having a spiral pattern track, of a lever for engaging and following said track, said lever being mounted to traverse the entire length of said track and devices for lifting said lever out of the said groove and returning the same to the point of starting, substantially as described.

7. The combination with a pattern cylinder having a spiral pattern track, of a lever for engaging and following said track, said lever being mounted to traverse the entire length of said track, a spring for returning said lever to the point of starting and means for raising said lever out of contact of said track to enable the spring to move the same, substantially as described.

8. The combination with a pattern cylinder having a spiral groove forming a pattern track, of a lever having provisions for engaging said groove, said lever being mounted to be forced by said groove from one end to the other of said cylinder, a spring to return said lever, and means to raise the lever out of said groove, substantially as described.

9. In a circular knitting machine having narrowing and widening devices, the combination with a revolving pattern device, of means for actuating the same connected with the operative parts for circular work only, and means for actuating the same during reciprocating work, which is inoperative during circular work, substantially as described.

10. In a circular knitting machine, the combination with a revoluble pattern device, of a ratchet operatively connected therewith, two pawls for actuating said ratchet in the same direction at different intervals of time and a stop plate for holding one pawl out of action while the other pawl is actuating said ratchet, substantially as described.

11. In a circular knitting machine, the combination with the pattern cylinder having a spiral pattern track, of two pawls for actuating said cylinder, and the stop plate for controlling the extent of movement of one of said pawls, said stop plate providing for the moving of the said cylinder at different distances of movement of the pawl controlled thereby, substantially as described.

12. In a circular knitting machine, the combination with a revoluble pattern device, of a ratchet connected with the same for joint movement, two pawls for actuating said ratchet, and a stop plate coöperating with one of said pawls to hold it out of operative movement and to permit it to have movements of differing distances, substantially as described.

13. In a knitting machine, the combination with a revoluble pattern cylinder, of a ratchet, a pawl for actuating said ratchet, a stop plate having a face for engaging a part connected with said pawl, the said face of the stop plate having a portion of its face for holding said pawl out of operation, another portion for permitting a short movement of the pawl, said stop plate also providing for a greater movement of the pawl and means for moving said plate past the pawl to produce varying movements of the pawl, substantially as described.

14. In a knitting machine, the combination with a revoluble pattern cylinder having a spirally grooved pattern track, of a ratchet connected with said cylinder, two pawls engaging said ratchet, a lever engaging the grooved pattern track of the said cylinder, and a stop plate having a varying face to engage a part connected with one of said pawls whereby the said lever moves the stop plate past the pawl and effects changes in the movement of the same, substantially as described.

15. In a circular knitting machine having independent needles, the combination with the knitting mechanism, of a drop stitch cam, a pattern mechanism for controlling the operation of said drop stitch cam and a timing device interposed between said pattern mechanism and said cam, substantially as described.

16. In a circular knitting machine, the combination with the knitting cam, of a drop stitch cam coöperating therewith, a cam plate for throwing said drop stitch cams into and out of operative position, means for controlling said cam plate including the timing disk having the cam flange and gate, substantially as described.

17. A circular knitting machine having narrowing and widening mechanism, and two cam cylinders operative during circular work, and one of which is stationary during reciprocating work, the knitting cam for reciprocating work being provided with two riser cams, and mechanism to operate one of said cams to produce tuck stitch work during circular knitting, substantially as described.

18. In a circular knitting machine, the combination with a plurality of knitting cams each engaging a continuous series of needles to produce solid plain knitting all around the entire knitted web, all of which are in operation during circular work, and one of which is operative during reciprocating work, of a riser cam coöperating with the cam operative during reciprocating work to make plain knitted work and means for actuating said cam for fancy tuck work, when desired, during circular knitting, substantially as described.

19. In a circular knitting machine, the combination with a cam cylinder, of a riser cam movable into and out of operative position, a fixed flange or ledge, and an outwardly extending projection from said cam, said projection extending below said ledge when in inoperative position and above the same when in an operative position, whereby the said cam is held by said ledge from upward movement when in its inoperative position, and held against downward movement when in operative position, substantially as described.

20. In a circular knitting machine, the combination with a cam cylinder, of a riser cam, movable into and out of operative position, and a ledge or flange extending part way around the cam cylinder for holding said cam from being moved from inoperative to operative position while passing said ledge or flange, substantially as described.

21. In a circular knitting machine, the combination with a cam cylinder for engaging a continuous series of needles forming a sectional part of the entire needle series of the machine, of a riser cam movable into and out of operative position in respect to the cylinder needle series, of a ledge or flange extending along the entire series of needles of the cylinder, to hold the said riser cam from moving from inoperative to operative position while said cam cylinder is engaging its series of needles, substantially as described.

22. In a circular knitting machine, the combination with a cam cylinder for engaging a continuous series of needles forming a sectional part of the entire series of needles of the machine, of a ledge or flange extending along the entire series of cylinder needles, a riser cam movable into and out of operative position, said riser cam being provided with a lug or projection extending outwardly beyond the inner face of the said flange or ledge, means for moving said riser cam into and out of operative position between the ends of said ledge or flange, whereby the said ledge or flange serves to hold the said cam in either position while passing the cylinder needles, substantially as described.

23. In a circular knitting machine, the combination with a knitting cam operable upon a continuous section of needles of the machine only, of a movable riser cam for coöperating with said knitting cam upon the same section of needles, said riser cam being movable into and out of operative position, and a flange or ledge for holding the said riser cam from being moved from one to the other position while passing its needle section, substantially as described.

24. In a circular knitting machine, the combination with a knitting cam, of a riser cam for coöperation with said knitting cam, said riser cam means for moving into and out of operative position, and a flange or ledge extending partially around the cam cylinder for coöperating with said riser cam to hold said riser cam from being moved from either position to the other while passing the said ledge or flange, substantially as described.

25. In a circular knitting machine, the combination with a knitting cam for coöperating with a continuous series of needles forming a section of the entire series of needles of the machine, of a riser cam for coöperating with said knitting cam upon the same section of needles, said riser cam being movable into and out of operative position and a flange or ledge extending along the entire section of needles aforesaid to hold said riser cam from being moved from one position to another while opposite its section of needles, substantially as described.

26. In a circular knitting machine, the combination with a movable riser cam operatable upon a section of the needles of means for moving the same into and out of operative position, and a ledge or flange for holding said cam from such movement, while moving past the said ledge or flange, substantially as described.

27. In a circular knitting machine, the combination with a movable riser cam for acting on a section of needles, and means for moving it into and out of operative position, of a stationary flange or ledge for holding said cam from movement while passing the said ledge or flange, substantially as described.

28. In a circular knitting machine, the combination with a movable riser cam for operating on a section of needles, a flange or ledge opposite said needle section for holding the cam from movement while passing said section and a cam plate for moving said cam opposite another section of needles, substantially as described.

29. In a circular knitting machine, the combination with a plurality of cam cylinders, of a tuck stitch cam for each cylinder, pattern mechanism for controlling one of said tuck stitch cams independently of the other cam, and means for connecting the actuating devices of the other cam with the actuating devices of said pattern controlled cam, whereby said tuck stitch cams will be made to act in unison.

30. In a circular knitting machine, the combination with a plurality of cam cylinders, of a tuck stitch cam for each cylinder, pattern mechanism for controlling one of said tuck stitch cams, and means for connecting the actuating devices of a plurality of tuck stitch cams together to cause the connected tuck stitch cams to act in unison, substantially as described.

31. In a circular knitting machine, the combination with a plurality of knitting cams, of a tuck stitch cam for each knitting cam, pattern mechanism for controlling one of said tuck stitch cams, and means for connecting the actuating devices of a plurality of tuck stitch cams including the pattern controlled cam together to cause the connected tuck stitch cams to act in unison, substantially as described.

32. In a circular knitting machine, the combination with a plurality of knitting cams, of a tuck stitch cam for each knitting cam, pattern mechanism for controlling one of said tuck stitch cams, and means for connecting and disconnecting the actuating devices of a plurality of tuck stitch cams including the pattern controlled cam, whereby said tuck stitch cams can be made to act in unison or separately, substantially as described.

33. In a knitting machine, the combination with a plurality of knitting cams each coöperating with a continuous section of needles less than the entire series of the machine, of a tuck stitch cam for each knitting cam, pattern mechanism for controlling one of said tuck stitch cams and means for connecting other tuck stitch cams with the controlling mechanism of the pattern controlled cam to cause such cams to act in unison, substantially as described.

34. In a circular knitting machine, the combination with two cam cylinders each having a riser cam operating as a tuck stitch cam, of means for operating said cams including two vibrating arms, and means for connecting said vibrating arms for joint movement, substantially as described.

35. In a circular knitting machine having narrowing and widening devices, the combination with a revoluble pattern device, of a pawl for actuating the same, a stop plate for holding said pawl out of operation, said stop plate having an adjustable extension for permitting said pawl to move said pattern device a variable amount during the knitting of the toe of a stocking, substantially as described.

36. In a circular knitting machine having a shaft for revolving the knitting cams and provision for changing the character of knitting, the combination with a stitch controlling cam, of mechanism for shifting the same including a timing device connected with said shaft for controlling the time of effecting the change of said cam, substantially as described.

37. In a circular knitting machine having a shaft for rotating the knitting cams and provisions for changing the character of knitting, the combination with stitch controlling cams, of means for shifting a plurality of said cams including a timing device for each cam connected with said shaft, substantially as described.

38. In a circular knitting machine having a shaft for actuating the knitting cams, the combination of a cam plate for shifting a stitch controlling cam, a pattern device, and connections between said pattern device and the said cam plate including a timing device on said shaft, substantially as described.

39. In a circular knitting machine, the combination with a plurality of knitting cams, each coöperating with a series of needles less than the entire number of the needles of the machine, of cams movable into and out of position to change the character of the knitting, pattern mechanism for controlling said movable cams, means connecting said pattern mechanism and cams including vibrating arms, a rock shaft to which one of said arms is secured, and the bell crank lever for connecting a vibrating arm with said rock shaft for conjoint movement, substantially as described.

40. In a circular knitting machine, the combination with a movable riser cam for operating upon a section of needles, of a flange or ledge holding said cam from being raised into operative position while passing its section of needles, substantially as described.

In testimony whereof we affix our signatures, in the presence of two witnesses.

EDWARD E. KILBOURN.
ISAAC W. KILBOURN.
GEORGE F. SMITH.

Witnesses:
ROBT. G. MILLER,
WILLIAM SILZER.